US008561095B2

(12) United States Patent
Dimitrova et al.

(10) Patent No.: US 8,561,095 B2
(45) Date of Patent: Oct. 15, 2013

(54) AFFECTIVE TELEVISION MONITORING AND CONTROL IN RESPONSE TO PHYSIOLOGICAL DATA

(75) Inventors: Nevenka Dimitrova, Yorktown Heights, NY (US); John Zimmerman, Ossining, NY (US); Lalitha Agnihotri, Fishkill, NY (US)

(73) Assignee: Koninklijke Philips N.V., Eindhoven (NL)

( * ) Notice: Subject to any disclaimer, the term of this patent is extended or adjusted under 35 U.S.C. 154(b) by 2402 days.

(21) Appl. No.: 10/014,179

(22) Filed: Nov. 13, 2001

(65) Prior Publication Data
US 2003/0093784 A1 May 15, 2003

(51) Int. Cl.
*H04H 60/33* (2008.01)
(52) U.S. Cl.
USPC ............... 725/10; 725/9; 725/12; 725/34
(58) Field of Classification Search
USPC ............................. 725/10, 12, 9, 34
See application file for complete search history.

(56) References Cited

U.S. PATENT DOCUMENTS

| | | | | |
|---|---|---|---|---|
| 5,243,517 A | * | 9/1993 | Schmidt et al. | 600/544 |
| 5,483,278 A | * | 1/1996 | Strubbe et al. | 725/61 |
| 5,664,046 A | * | 9/1997 | Abecassis | 386/125 |
| 5,676,138 A | * | 10/1997 | Zawilinski | 600/301 |
| 5,774,591 A | * | 6/1998 | Black et al. | 382/236 |
| 5,896,164 A | * | 4/1999 | Orbach et al. | 725/12 |
| 5,945,988 A | | 8/1999 | Williams et al. | 345/327 |
| 5,973,683 A | | 10/1999 | Cragun et al. | 345/327 |
| 6,111,580 A | * | 8/2000 | Kazama et al. | 715/863 |
| 6,124,877 A | * | 9/2000 | Schmidt | 725/10 |
| 6,190,314 B1 | * | 2/2001 | Ark et al. | 600/300 |
| 6,400,996 B1 | * | 6/2002 | Hoffberg et al. | 700/83 |
| 6,516,464 B1 | * | 2/2003 | Claessens | 725/9 |
| 2002/0178440 A1 | * | 11/2002 | Agnihotri et al. | 725/10 |
| 2003/0005431 A1 | * | 1/2003 | Shinohara | 725/12 |
| 2003/0101449 A1 | * | 5/2003 | Bentolila et al. | 725/10 |

FOREIGN PATENT DOCUMENTS

| | | |
|---|---|---|
| EP | 1063846 A2 | 12/2000 |
| JP | 11153977 | 6/1999 |
| JP | 200209578 | 7/2000 |
| WO | 001148 A2 | 1/2000 |
| WO | WO 0115449 A1 * | 3/2001 |

OTHER PUBLICATIONS

PHA 23,847, U.S. Appl. No. 09/442,960, filed Nov. 18, 1999.
"Modelling the Dynamics of Facial Expressions", by Antonio Colmenarez et al.
"Integrated Multimedia Processing for Topic Segmentation and Classification", by R.S. Jaeinschi et al.

(Continued)

*Primary Examiner* — Pankaj Kumar
*Assistant Examiner* — Sahar Baig

(57) ABSTRACT

A system and method for collecting, analyzing, and using sensory reactions and involuntary or spontaneous movements by members of a television viewing (or listening) audience. While known programming is displayed on a television receiver, a plurality of sensors monitor the viewer or viewers for recognizable evidence of an emotional response that can be associated with a discrete program segment. Where positive (or negative) responses can be associated with a certain type of program content, the system monitors subsequent programs for the opportunity to notify the viewer or simply present (or avoid presenting) the program automatically.

37 Claims, 5 Drawing Sheets

(56) References Cited

OTHER PUBLICATIONS

"A Tutorial on Hidden Markov Models and Selected Applications in Speech Recognition" Lawrence R. Rabiner.

"The Galvactivators: A glove that senses and communicates skin conductivity", by Rosalind Picard et al., MIT Media Laboratory, pp. 1538-1543.

* cited by examiner

AFFECTIVE TELEVISION MONITORING AND CONTROL IN RESPONSE TO PHYSIOLOGICAL DATA

TECHNICAL FIELD OF THE INVENTION

The present invention is directed, in general, to television audience feedback collection systems and, more specifically, to a system and method for using human-response inputs to automatically create a viewer profile.

BACKGROUND OF THE INVENTION

Modern television systems effectively process an amazing quantity of audio-visual input to present viewers with high quality programs from a wide variety of sources. Many of these sources are broadcast networks that send programming through cables or over the airwaves. Other sources may be more local or limited. Private networks, for example, may transmit programming that is intended only for a limited audience, and many homes are equipped with videocassette recorders (VCRs) or other recording devices which, once they hold recorded material, are programming sources themselves.

Modern viewers, therefore, have a great deal of programming choice. As most of the programming is generated for commercial reasons, program producers have an interest in determining what viewers want or like to watch so that popular programming can be used as a guide to designing programs for the future. In addition, in order to cope with the huge quantity of available programming there are various devices for allowing viewers to selectively focus on a relatively small portion of it, should they choose to do so. For example, a viewer may simply choose to subscribe to only certain channels of programming. For whatever purpose it is collected, however, it is often useful to collect data regarding the viewing preferences of a television user (viewer). There are several ways in which to collect helpful data on what it is that people prefer to watch. First of all, viewers can simply be asked. A given program might be shown to a test audience, and then its members queried to determine their reaction. Although generally efficacious, this approach does have several drawbacks. For one thing, it requires a great many interviewers to ask the questions and record the answers. Then the answers must be properly interpreted if an accurate reading of viewer likes and dislikes is to be made. For these reasons, this approach, in general, is of value only with a limited test audience. Because the viewer response is to be collected from only this limited audience, these viewers must be properly selected to ensure their responses will be representative of the viewing public at large.

Interview personnel are not required, of course, if the test viewers are simply asked to supply answers to predetermined written questions, write a description of their response, or "vote" for which of a plurality of programs they enjoyed the most. This approach is also subject, however, to even more errors in interpretation and carries with it a problem that might be referred to as respondent fatigue. This is the situation where the test viewer may at some point get tired of answering questions or filling out forms, and, if so, complete them carelessly because all they now desire to do is fulfill the agreed assignment. There also exists the problem of purposely misdirected answers, where the viewer senses the purpose of a question and, for some reason, provides a misleading response. For example, programming that is attractive to a viewer might be explicit or violent enough that the viewer does not want to admit its pleasing nature. However well motivated, such behavior corrupts the testing process.

And, of course, the results are only as good as the questions asked and the answers given. Any interview script or written questionnaire must be carefully designed to yield accurate responses, even from a sincere and earnest respondent. All of this requires time, money and other resources, and so only a limited audience may be tested. However carefully the testers try to assemble test audiences to provide statistically valid samples, they are limited to those having the willingness to respond to questions. This problem exists even where viewers are called at home and questioned about how they watch, and about their viewing habits in general. And with any of the methods described above, the problem persists that generally the viewer bases the report of their reaction on the viewed program as a whole, and not on the specific segments of the program that may have produced a positive or negative response. In many cases, such responses may be intuitive or subliminal, and even an earnest viewer may not be able to pinpoint exactly what portion of a program was most desirable. Finally, the questions and answers, or other inquiry mechanism must either follow the entire program or interrupt it before it is finished. In either case, the integrity of assessing the audience reaction is compromised. As mentioned above, viewer feedback may also be used merely to simplify their own channel selection process. But even where viewers simply try to remember which programs they like and adjust their channel selector, the results may be far from perfect. Their recollection may be faulty, and the channels they select may not be well matched to their real preferences. In any case, they must perform the selection manually, and may procrastinate in doing so because it is too much trouble.

Needed then is an unintrusive and automatic method of gauging audience reaction to television and similar programming that can be implemented over a wide testing audience, and that provides accurate feedback to the party conducting the test, or simply to an automatic program-selection assistance system. The system and method of the present invention provide just such a solution.

SUMMARY OF THE INVENTION

To address the above-discussed deficiencies of the prior art, it is a primary object of the present invention to provide, for use with a television system, a system and method for collecting and analyzing, accurately and unobtrusively, audience reaction to specific programs and program segments. One or more viewer-feedback sensors are placed in proximity to each test viewer to collect response information. The response data is translated into digital form for storage and analysis and stored at a system database. The response information stored on the database is time-stamped so that it can be corrected with a specific program segment. A set top box is coupled to one or more programming sources. A control program either selects the programming for the viewers to watch or allows them to make their own selection.

Once a sufficient quantity of material has been viewed, the data associated with an identifiable program segment is assessed. A reporting device delivers the results of the analysis.

In a particularly preferred embodiment, the reported results are used to inform the testing process so that viewer responses can be confirmed.

In another particularly preferred embodiment, the viewer responses are associated with a viewer preference level (indicative of viewer likes or dislikes, which are inferred from the collected response information.

Additional objects and advantages of the present invention will be more fully described in the DETAILED DESCRIPTION of the invention.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. In the description of the exemplary embodiment that follows, the present invention is integrated into, or is used in connection with, a digital television receiver. However, this embodiment is by way of example only and should not be construed to limit the scope of the present invention to digital television receivers. In fact, those skilled in the art will recognize that the exemplary embodiment of the present invention may easily be modified for use in analog television receivers and other similar devices as well.

Note that television "program" or "programming" will be used generally herein to refer to programs, or portions thereof, that may be displayed on a television receiver or similar device including, for example, broadcast or cable TV, prerecorded video tape or DVD presentations, and streaming multimedia sent over a telecommunications or computer network. As used herein, "television programming" also includes audio programming and textual or multimedia presentations, whether they accompany an actual television broadcast or not. For example, radio broadcasts and multimedia web page presentations are included as well (and in appropriate instances "view" or "viewer" will refer to simply listening, or listening and reading as well as actually seeing video images).

Figure 1:
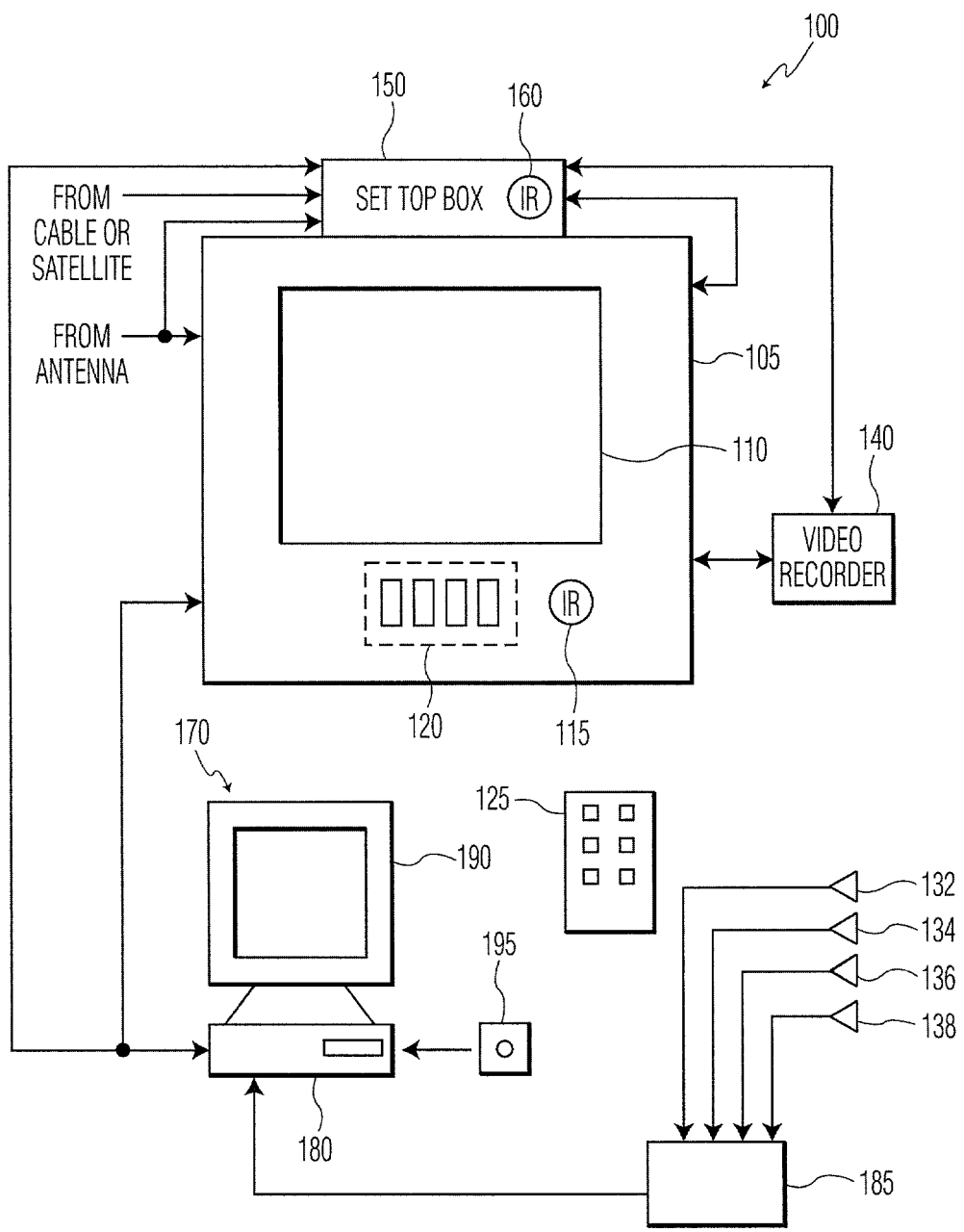
FIG. 1 illustrates an exemplary television-receiver system, according to one embodiment of the present invention.

FIG. 1 illustrates exemplary television system 100, according to one embodiment of the present invention. Exemplary television system 100 comprises television receiver 105, set top box 150 with infrared (IR) detector 160, and video-recording device 140 (which, although typically so-called, usually records program audio, as well). As will be explained below in greater detail, the present invention provides a system for collecting and using viewer-response as feedback for research purposes and for the enhanced operation of television receiver 105, especially with regard to the programming material selected for display and for recording.

Television receiver 105 comprises display screen 110 for displaying television programs provided by a cable or satellite television program service provider, and for displaying previously recorded material. Receiver 105 also includes infrared (IR) sensor 115, and a set of manual controls 120, as indicated by a surrounding dotted line. Manual controls 120 may include, without limitation, a power button, a volume control button, vertical and horizontal control buttons and one or more channel selection buttons. Infrared (IR) sensor 115 receives IR control signals from an optional hand-held remote control 125 that may be operated by the television viewer. Typically, IR control signals from remote control 125 that are detected by IR sensor 115 are processed within television receiver 105 in order to change the channel being viewed on display screen 110, to increase or to decrease the volume, to turn television receiver 105 on and off, and the like. Optionally, the IR control signals detected by IR sensor 115 may be relayed to set top box 150 in order to control the operation of set top box 150.

Set top box 150 performs conventional tuning and demodulation of incoming signals from a cable or satellite television program service provider to produce, for example, a stream of Moving Picture Experts Group (MPEG) encoded digital data from which video signals may be derived. Alternatively, television receiver 105 may directly receive an incoming television broadcast signal from an external antenna (not shown). In this alternative embodiment of the invention, television receiver 105 performs conventional tuning and demodulation of incoming RF signals received from the antenna to produce, for example, a stream of MPEG encoded digital data from which video signals may be derived. The external antenna, if present, may also be connected to set top box 150.

Set top box 150 also includes infrared (IR) sensor 160. IR sensor 160 receives infrared (IR) control signals from hand-held remote control 125 operated by the television viewer. Preferably, remote control 125 that controls set top box 150 is the same remote control 125 that operates television receiver 105. Typically, IR control signals that are detected by IR sensor 160 are processed within set top box 150 in order to change the channel being transmitted to television receiver 105 for viewing on display screen 110, to turn set top box 150 (and/or television receiver 105) on and off, and to adjust other television controls.

Video recorder 140 is a device that records programs for the viewer to watch at another time. It may be connected to television receiver 105 or, preferably, directly to set top box 150, and is capable of recording what is being displayed on display 110, but can also record when the display is off. A particular advantage is obtained when television system 100 is configured such that one program may be recorded while a second is being displayed. Video recorder 140 may be, but is not necessarily a video cassette recorder (VCR), and may be able to play back programs not received from set top box 150 or receiver 105, for example, using a removable media such as a videotape or floppy disk, or may be connected directly or indirectly to a network that allows downloading of programs for recording and playback. In addition, recorder 140 might be coupled with the TV 105 or with the set-top box 150.

In an advantageous embodiment of the present invention, set top box 150 may be integrated into television receiver 105. The integration of set top box 150 and television receiver 105 commonly occurs, for example, where television receiver 105 is a high-definition digital television (HDTV) receiver. Because the functions and principles of operation of set top box 150 are well known, television manufacturers frequently find it advantageous to integrate set top box 150 into television receiver 105, thereby reducing the amount of equipment, wiring, and set-up work required to be performed by the television viewer.

Preferably, television system 100 also includes a personal computer (PC) 170, which is in communication with both television receiver 105, and set top box 150. PC 170 comprises central processing unit (CPU) 180, video monitor 190, and removable storage medium 195. PC 170 also comprises conventional elements (not shown) such as a keyboard, a mouse, an internal hard disk drive, and a random access memory (RAM). In one embodiment of the present invention that uses PC 170, the system for collecting viewer feedback comprises CPU 180 and a program stored in the random access memory (RAM) (not shown) of CPU 180 or stored in the internal hard disk drive (not shown) of CPU 180. The program may also be stored on removable storage medium 195, which may be, for example, a 3.5 inch floppy diskette, a compact disk read only memory (CD ROM), a digital video disk (DVD), or a similar storage medium.

In addition, the viewer-feedback collection system of the present invention comprises a plurality of viewer-response sensors, enumerated in FIG. 1 as 132, 134, 136, and 138, although there may be any number of them. Sensor-signal receiver 185 receives the response signals produced by the viewer-response monitors 132-138 in their unprocessed state and processes them for storage and analysis by PC 170.

In an advantageous embodiment of the present invention, the system for collecting viewer responses may be an embedded system integrated into television receiver 105. In an alternate advantageous embodiment of the present invention, the system may be implemented in a set top box 150. In other words, the components of television system 100 that are in FIG. 1 shown separately, namely, sensor-signal receiver 185, PC 170, and set top box 150, may be incorporated into a single physical unit—such as receiver 105—or their functions distributed in some other fashion.

Figure 2:
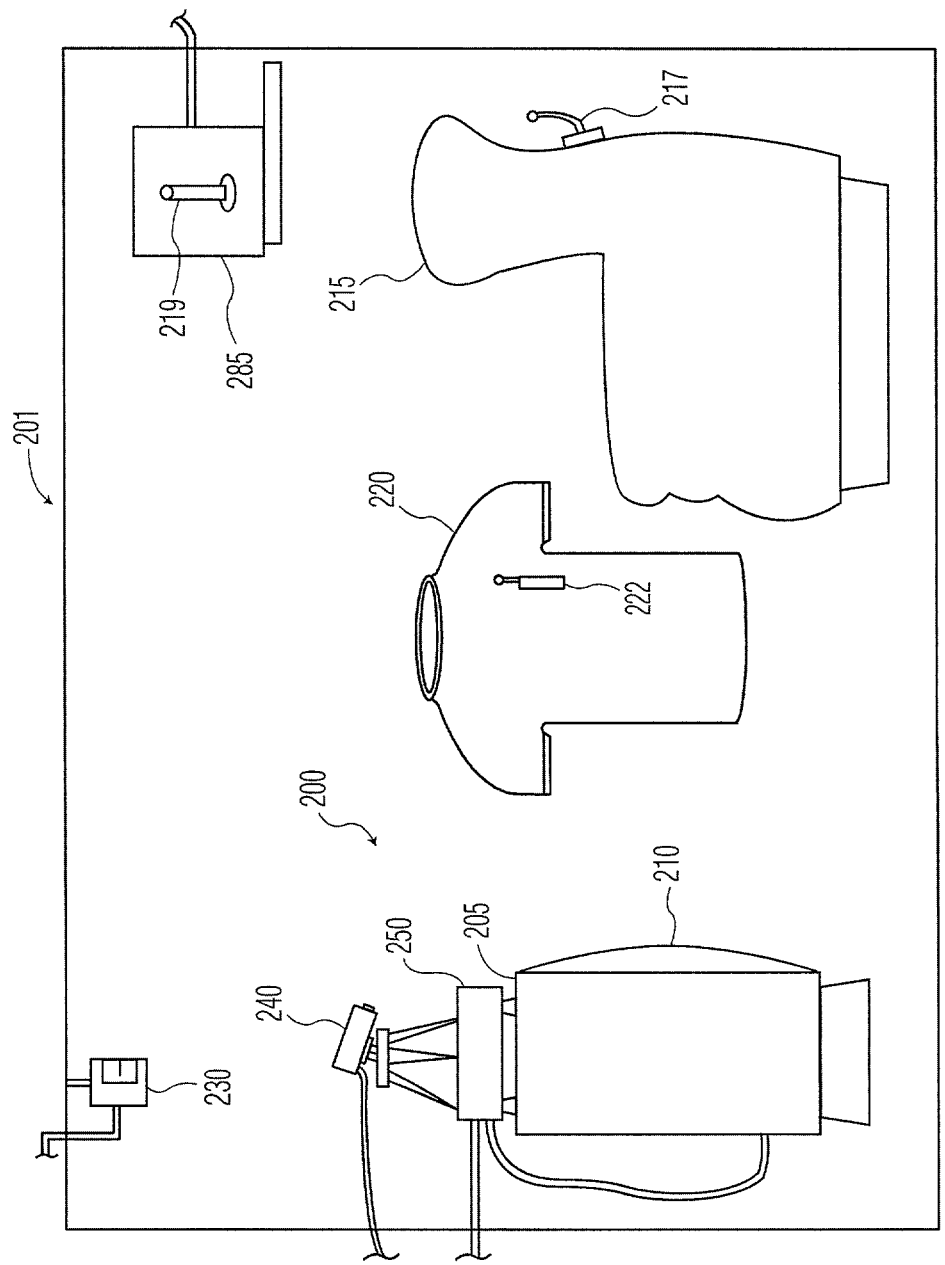
FIG. 2 illustrates an exemplary system for collecting viewer responses to program segments that is implemented in a system analogous to the exemplary television receiver system of FIG. 1, according to a similar embodiment of the present invention.

FIG. 2 illustrates an exemplary system for collecting viewer reactions to programs and program segments that is implemented in a system analogous to the exemplary television receiver system 100 of FIG. 1, according to a similar embodiment of the present invention. Television receiver system 200 includes television receiver 205 having display 210. Set top box 250 receives programming information, as previously described, and transmits it to receiver 205. Note that television receiver system 200 is for clarity somewhat simplified from the embodiment illustrated in FIG. 1, though the various components shown there may be present as well in system 200. Ideally, the viewer is seated in chair 215, at least at the beginning of a test-audience section. By "test audience", it is meant that, as according to one embodiment of the present invention, the system may be used in a controlled test situation. In an alternate embodiment, where the system is employed in a viewer's home, a similar chair 215 could nevertheless be provided. Note that the system and method of the present invention is applicable for use in either application, and features described herein applicable to one will be deemed applicable to the other unless the need for distinction is either explicitly pointed out or readily apparent from the context.

Chair 215 is optionally equipped with sensors (not shown) for recording such aspects of the viewer's condition as temperature, posture, propensity to move around or to be still, and so on. A microphone (not shown) may also be present in or attached to chair 215 for recording responsive sounds such as laughter or conversational speech. Signals generated by these sensors are collected and converted into radio signals for wireless transmission to sensor-signal receiver 285. Chair 215 and sensor-signal receiver 285 are equipped with antennae 217 and 219, respectively, to aid radio communication between them. Wireless transmission is not required, of course, and sensor-signals may also be transmitted by other means such as infrared or simply through a cable. Sensor shirt 220 provides another device for collecting viewer feedback via involuntary or spontaneous responses. Note that the "involuntary" or "spontaneous" responses sought here are those that occur naturally for the viewer while watching the displayed programming. That is, these terms refer generally to responses or reactions to the programming itself, at or near the time it is being displayed, and not to responses to a later query such as an interviewer's questions. A key advantage of the present invention, therefore, is the ability to receive reactions that can be connected directly with program segments, and at the same time allow the program to continue uninterrupted. Sensor shirt 220 may be used in conjunction with or as an alternative to chair 215. Sensor shirt 220 contains one or more sensors to measure viewer conditions such as a body temperature sensor, heart rate monitor, perspiration detectors and so forth. In a particularly preferred embodiment, sensor shirt 220 includes a galvactivator (not shown), which measures skin conductivity response (also known as the electrodermal response), taking advantage of the phenomenon that the skin momentarily becomes a better conductor of electricity when either external or internal stimuli occur that are physiologically arousing. This phenomenon is more fully explained in Rosalind W. Picard & Jocelyn Scheirer, *The Galvactivator: A Glove that Senses and Communicates Skin Conductivity*, PROCEEDING FROM THE 9TH INTERNATIONAL CONFER- ENCE ON HUMAN-COMPUTER INTERATION, NEW ORLEANS (August 2001), which is incorporated herein by reference. As should be apparent to one of ordinary skill in the art, such a sensor may also be incorporated into a glove or other article that is placed in contact with the viewer. This listing is intended to be illustrative and not limiting. Sensor shirt 220, glove, or other sensory device preferably includes wireless transmitter 222 for transmitting sensor data to sensor-signal receiver 285.

Other viewer-condition sensors present in the embodiment of FIG. 2 include motion sensor 230 for sensing motion about (or even in-and-out of) the viewing room 201. There may be more than one motion sensor depending on the (field) of motion to be covered. Motion sensor 230 is ordinarily connected with sensor signal receiver 285 via a cable connection, but any of the other methods, such as those previously mentioned, may also be used. Video camera 240 is positioned to capture an image of a viewer seated in chair 215, and in particular, the head and face region of the viewer. It may be stationary or movable. In the latter case, a drive-control system (not shown) may be used to assist the video camera in tracking and staying focused on the viewer.

Video camera 240 may be used to provide sensory information in a variety of ways. Unlike most of the other sensors previously recited (with the exception of the microphone), its signal output can merely be saved onto a video recording device such as video recorder 140 shown in FIG. 1. Normally, however, a separate video recorder (not shown) will be used if the viewer-reaction video images are to be recorded as such. In a particularly preferred embodiment, however, the video information is separately processed to enhance its feedback value and to eliminate (or corroborate) any analysis of the video image performed by a human operator.

In a preferred embodiment, sensory information gathered through a plurality of sensors, such as the various devices described, will be analyzed in combination to yield a more accurate profile of viewer response than would be obtained from simply looking at each sensory input in isolation. For example, a particular galvactic response may include arousal, but leave open to question whether the elicited but unspecified emotion is good or bad. Used in combination with visual cues, however, valence can also be gauged; a smile, for instance, indicates this particular state of arousal is a happy one. As another example, either a visual response such as a furrowed brow, or an audio response such as a question being asked (as determined by the speaker's rising end-of-sentence inflection), might indicate confusion or lack of understanding. When the inputs are considered together, however, the likelihood increases that this is the correct determination.

Figure 3:
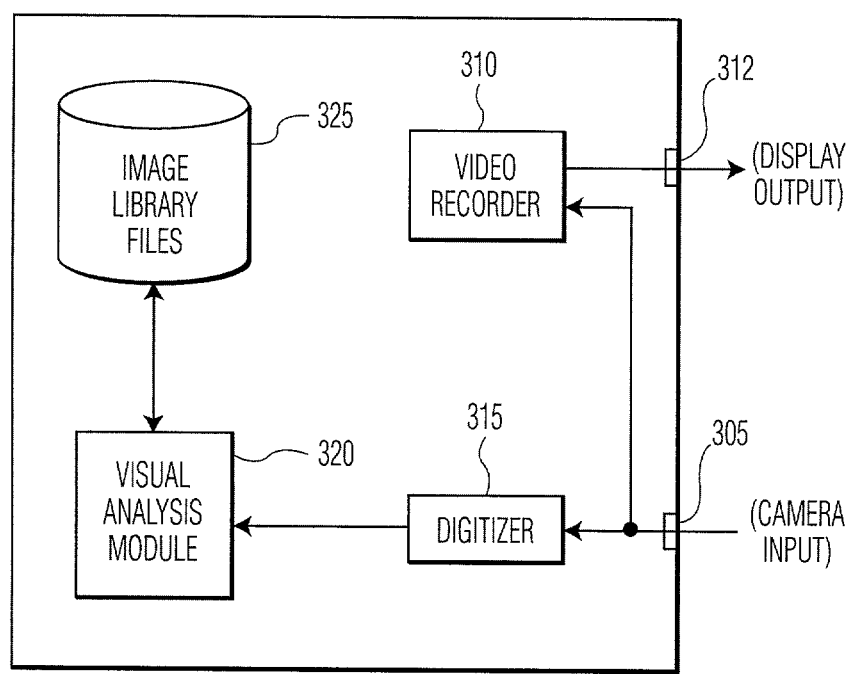
FIG. 3 is a block diagram illustrating a video processor that may be used to process input from a video camera according to a preferred embodiment of the present invention.

FIG. 3 is a block diagram illustrating a video processor 300 that may be used to process input from a video camera 240 according to a preferred embodiment of the present invention. Video processor 300 receives video input from camera 240 at input port 305. Preferably, video processor 300 also includes video recording medium 310 for recording the image captured by camera 240. Again, "video recording" is used herein for convenience. Typically, video recorders record audio and even perhaps accompanying text (such as closed-captioning) as well. In the illustrated embodiment, video processor outputs recorded video through output port 312, if desired, for display. The video input received through port 305 is also sent to digitizer 315 where it is converted into a standard digital format for processing. Each frame of the digitized image or, alternately, each of a selected subset of the frames, is compared in visual analysis module 320 to similarly digitized images of known facial expressions or movements of the viewer stored in video library files 325. For a more complete discussion of the analysis of facial gestures, see Antonio Colminarez, *Modeling the Dynamics of Facial Expressions,* _____ (submitted to the Computer Vision & Pattern Recognition Conference to be held in Hawaii from Dec. 11-13, 2001), which is incorporated herein by reference. The comparison may be done on a pixel-by-pixel basis (using all or a portion of the pixels) or by using any known image analysis algorithm. Preferably, the reference video images stored in library files 315 are those of the viewer personally, but may also include a catalog of reference views from others, as well. The purpose of the comparison step is to determine as accurately as possible if a captured viewer expression or movement can be recognized as one associated with a known emotion or other human reaction. It is understood, of course, that any such evaluation is predictive or approximate rather than certain, and no implication is to be taken herein that a certain determination is claimed or even possible. Nevertheless, the information provided by video processor 300 provides important input when evaluated in context. Matches detected by visual analysis module 320 are reported to sensor-signal receiver 285. If no matches are found, the report may indicate this condition or simply be omitted.

Figure 4:
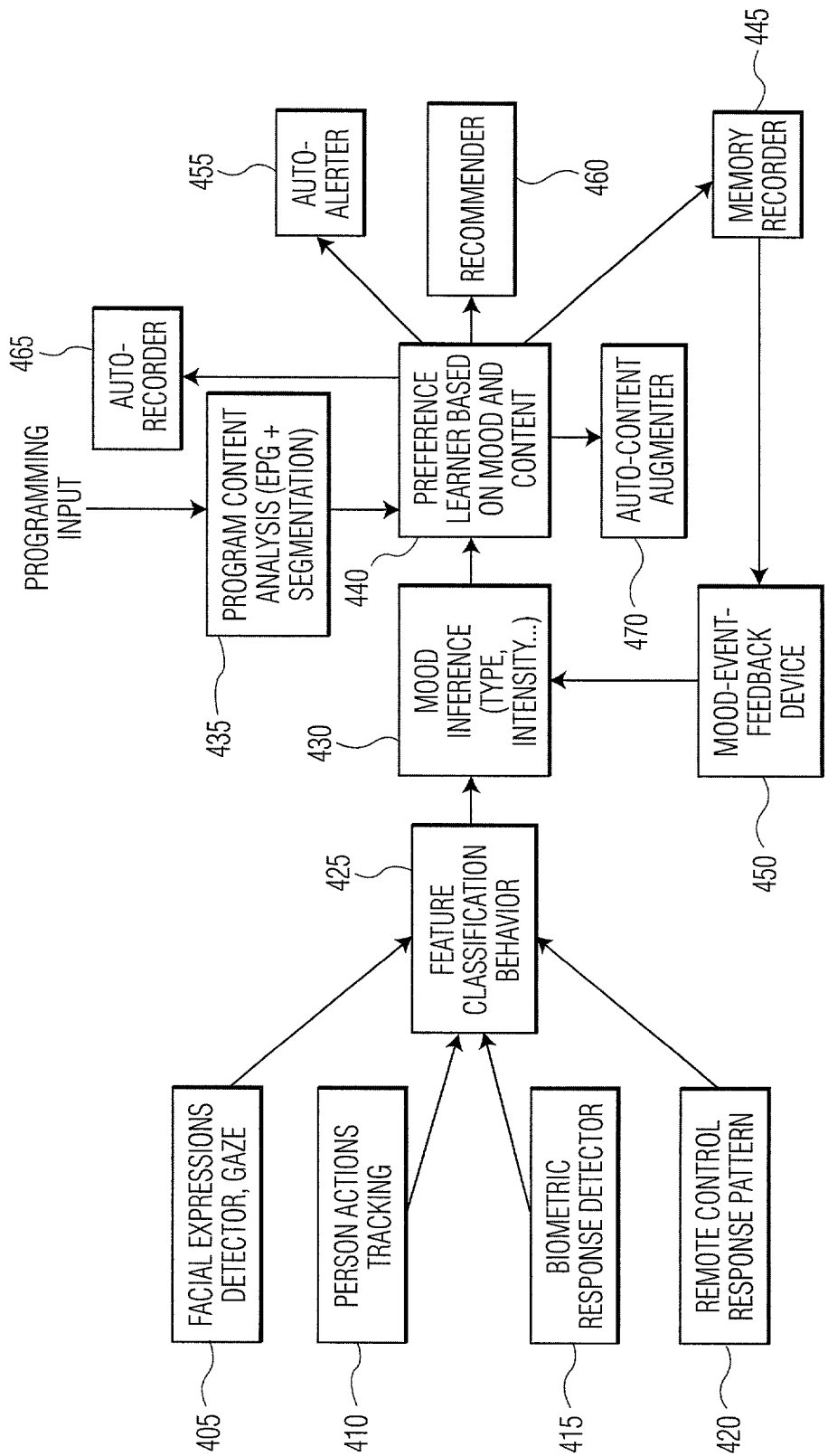
FIG. 4 is a system diagram illustrating the interaction of sensory inputs according to one embodiment of the present invention, as well as possible applications for using the gathered and processed sensory data.

FIG. 4 is a system diagram illustrating the interaction of sensory inputs according to one embodiment of the present invention, as well as possible applications for using the gathered and processed sensory data. Again, this embodiment is illustrative and not limiting. As described above, facial expressions and head movements are analyzed against reference images to determine recognizable emotions (block 405). Indicators such as smiles and the intensity of a gaze (that is, duration without moving and the direction of gaze) are interpreted according to a set of predetermined criteria. Gross actions are also interpreted, such as movement around the room (block 410) as detected by video camera 240 or motion sensor 230. In addition, biometric response data captured by sensors on, for example, chair 215 or sensor shirt 220 (block 415) may be characterized as associated with certain human emotional responses in a manner similar to that described above in association with captured video images, albeit with somewhat less certainty in most cases. Note that certain sensory data, such as body temperature, may simply be analyzed by noting changes against a baseline or previous level. This type of analysis is certainly easier than the video image comparisons, though in one preferred embodiment it also takes into account changes in environmental conditions, for example room temperature, outside weather conditions, ambient noise level, time of day, and the like.

Other inputs may, of course, also be taken into consideration, for example, the viewer's action in changing programming selections, especially where provided with a remote control, such as remote control 125 (shown in FIG. 1), making such changes easy to execute (block 420). The programming changes may indicate a distaste for a particular program segment, or if frequent and without apparent direction, may indicate general boredom. In some cases, a viewer may engage in "channel surfing" where numerous channels are reviewed for short intervals in rapid succession. Even where part of an overall pattern, however, a longer than expected pause to view a particular segment may be informative. And the physical force being applied with each press of the "next-channel" button, as measured by a deflection gauge or similar device in the remote control 125, may indicate boredom or frustration—especially when coupled with the sensing and recognition of certain contemporaneous audio responses, such as sighs or expletives. As shall be apparent, experience and observation while practicing the system and method of the present invention will enhance the ability to correlate certain sensory inputs, alone or in combination, with certain human emotional responses.

Each of the sensory-input features described above, and any others available as well, are fed directly or indirectly for classification of the particular behavior or condition involved (block 425). The individual inputs are each examined to determine if a discrete recognizable condition or change in condition can be segregated from the continuous, or at least intermittent stream of related input. Once a discrete sensory event is classified, it can be compared with a knowledge base of data in an attempt to correlate with a known mood, emotion, or other reaction (block 430). It may also be possible to determine how intense the particular mood or emotion is.

In a preferred embodiment, the extracted facial expressions from the visual domain are all labeled by symbols and given values for the feature vector. For example, if there are five states: sad, laughing, indifferent, bored, afraid, then these are symbolically encoded (preferably with numbers). Also, the volume of the emotion is recorded (e.g. from mild to extreme happiness) on a scale from 0 to 1, and the degree of certainty of the algorithm is also recorded. The viewer's pose and actions are tracked and these are also recorded: sitting, getting up, distracted reading a newspaper, shouting, etc. (these are also specific values for our feature vector). The Biometric responses are also recorded: electrocardiogram, electromyogram, respiration and skin conductance sensors that measure the autonomic nervous system activation. These signals are digitized in real time and recorded. All these features are not necessarily useful. First in the learning mode, a linear discriminate function can be used to rank each feature individually based on recognition performance to find an optimal set of features for recognizing patterns. Also, the remote control response pattern can fall into several categories and classified into: "channel zapping", active watching (with volume up, rewind, or slow mode), semi-active watching, non-active. All these values are used in the feature vector f=(f1, f2, . . . fn), and the feature vector is recorded for a time segment (e.g. every 2 seconds).

Next, these observation symbols are fed into a Hidden Markov Model. Hidden Markov Model (HMM) is a common technique widely used in signal processing. The essence of HMM is to construct a model that explains the occurrence of observations (symbols) and use it to identify other observation sequences. The fundamentals of HMM and its applications are presented in L. R. Rabiner, *A Tutorial on Hidden Markov Models and Selected Applications in Speech Recognition*, 77 PROCEEDINGS OF THE IEEE 257-285 (1989), which is incorporated herein by reference.

Briefly stated, In an HMM, there are a finite number of states and the HMM is always in one of those states. At each clock time, it enters a new state based on a transition probability distribution depending on the previous state. After a transition is made, an output symbol is generated based on a probability distribution depending on the current state. In the formal definition of HMM, the states are denoted as $Q=\{q_1, q_2, \ldots q_N\}$, where N is the number of states and the observation symbols are denoted as $V=\{v_1, v_2, \ldots V_M\}$, where M is the number of observation symbols. The transition probability distribution between states is represented by a matrix $A=\{a_{ij}\}$, where $a_{ij}=Pr\{q_j$ at $t+1|q_i$ at $t\}$, and the observation symbol probability distribution is represented by the matrix $B=\{b_j(k)\}$, where $b_j(k)$ is the probability of generating observation $v_k$ when the current state is $q_j$.

The system consists of two phases, namely training and classification. We construct different HMM's, corresponding to different behavior (e.g. strong liking, indifference, disgust, appalled), through training with a collection of feature values as explained above. The HMM training is essentially adjusting parameters of $\lambda=(A, B, \pi)$ to maximize the probability of the observation sequences $Pr(O|\lambda)$. Here $\pi$ stands for the initial state distribution and is defined as $\pi=\{\pi_i\}$, where $\pi_i$ is the probability of state $q_i$ being the initial state of the HMM. O is the observation sequence.

In the classification phase, the observation sequence consisting of high level labels is extracted from a given set of input feature values for facial, biometric, person action, and remote control response patterns. Then the sequence is fed to the different HMM's (e.g. for strong liking, indifference, disgust, appalled) as input and is classified as the class of the HMM that generates the highest response (probability of the observation).

Once the behavior of the viewer is identified, it is fed back into the system along with the type of the program and program segment currently being viewed by the viewer. Inferences are made as to whether the user likes, dislikes or is neutral to the program being shown. This is then used to present a different program (or some action to improve the programming content like augmentation etc.) to the viewer that might be better enjoyed based on the viewing profile of the user. The response to this new information is monitored to learn the kind of information or action that the user prefers in different cases. In this way, a combination of the behavior is used for mood inference, type, intensity, and the like, in block 430.

Along with this viewer condition analysis, the program input to which the viewer is being exposed is also analyzed (block 435). Electronic program guide (EPG) information is descriptive data relating to the remainder of programming input available from a given source. While some of this information is used to generate an actual program guide display that may be used by a viewer in making a channel selection, other information is used by the system of the present invention for associating displayed program content with witnessed viewer behavior. In other words, the EPG provides electronic cues to the system indicating when a particular program has started or finished. Note that the use of program segments results from a recognition that even a single television program or motion picture is not a homogeneous event, but rather a series of segments (or "scenes"). The process of video segmentation and selection at subprogram level is explained more fully in U.S. patent application Ser. No. 09/442,960, entitled METHOD AND APPARATUS FOR AUDIO/DATA/VISUAL INFORMATION SELECTION, filed by Nevenka Dimitrova, Thomas McGee, Herman Elenbaas, Lalitha Agnihotri, Radu Jasinschi, Serhan Dagtas, Aaron Mendelsohn on Nov. 18, 1999, co-owned by the Assignee of the present application, and incorporated herein by reference. Further explanation is also provided in R. S. Jasinschi, N. Dimitrova, T. McGee, L. Agnihotri, J. Zimmerman, & D. Li, *Integrated Multimedia Processing for Topic Segmentation and Classification*, PROCEEDINGS OF THE IEEE INTERNATIONAL CONFERENCE ON IMAGE PROCESSING (Thessaloniki, October 2001), which is also incorporated herein by reference. The viewer response to each of these segments may well be a more useful estimator of viewer preferences than an evaluation of the program as a whole. It is in this light that the system and method of the present invention is most advantageously used.

In one particularly preferred embodiment, a programming provider supplies (presumably for a fee) at least some sensory equipment to a programming subscriber (that is, a viewer), or provides instruction on how to connect electrical devices commonly found in subscribers' home (such as a video camera) to provide sensory readings. The sensory signals, processed or unprocessed, are returned to the provider, who analyzes them and uses them to either adjust the programming content being set to the viewer or to create a channel selection control for the subscriber's (viewer's) use that assists the viewer in selecting programming similar to that which produced positive responses. In this situation, of course, the EPG information preferably includes program segmentation information so that a sensed viewer reaction can be associated with a particular program segment.

Instead of, or in combination with, using EPG information to segment programming (i.e., divide it up logically into segments to be compared with discrete viewer responses), a segmenting function may also be included, for example, in set top box 150, to automatically divide the program appropriately for analysis. The program (and program segmenting) information is compared to the moods and emotions determined to occur during the program segments, providing important program preference information (block 440). This preference information can be used in a variety of ways. First, of course, it can be stored in a memory recorder (block 445), and reviewed later as another aid to predicting future viewer preferences. This may be done in a test situation or, as previously described, where the system operates in a viewer's home, the information may be transmitted to the programming provider for individual or aggregate (that is, test-audience) analysis. As regards the individual viewer, the learned preferences information may also be processed (block 450) for use in future mood or emotion determinations (block 430). In addition, the preference information may be used, based on the assumption that the user would choose programming content that would appear similar to previously-viewed content that produced a favorable reaction, if the viewer is given the opportunity to do so. This effect may be accomplished by a simple alert, notifying the viewer that a particular type of programming is now available (block 455). Or a number of similar upcoming programs may be offered as a recommendation (block 460). In either case, of course, the user is simply offered the opportunity to view or record the recommended programming. In an alternate embodiment, however, the system may simply select certain programming for recording, automatically sending it to a recording device (block 465). This is especially useful where there is the capability to record a great deal of material, so that the programming may be saved for some time and not simply overwritten in the next recording session. Finally, the actual content of the viewed or recorded programming may be augmented based on previously learned user preferences (block 470). The augmenting material is presumably available from the programming provider, but used according to the individual tastes of the viewer. For example, a viewer who has previously demonstrated a preference for action scenes may have a car chase inserted in place of a courtroom scene, while another viewer who prefers comedy may have a humorous sequence instead. If the viewers are willing to indicate their identity in some fashion, of course, or if identity can be automatically determined by system sensors, the system may customize programming to their individual tastes (or to composite tastes, for multiple viewers that frequently watch together).

Figure 5:
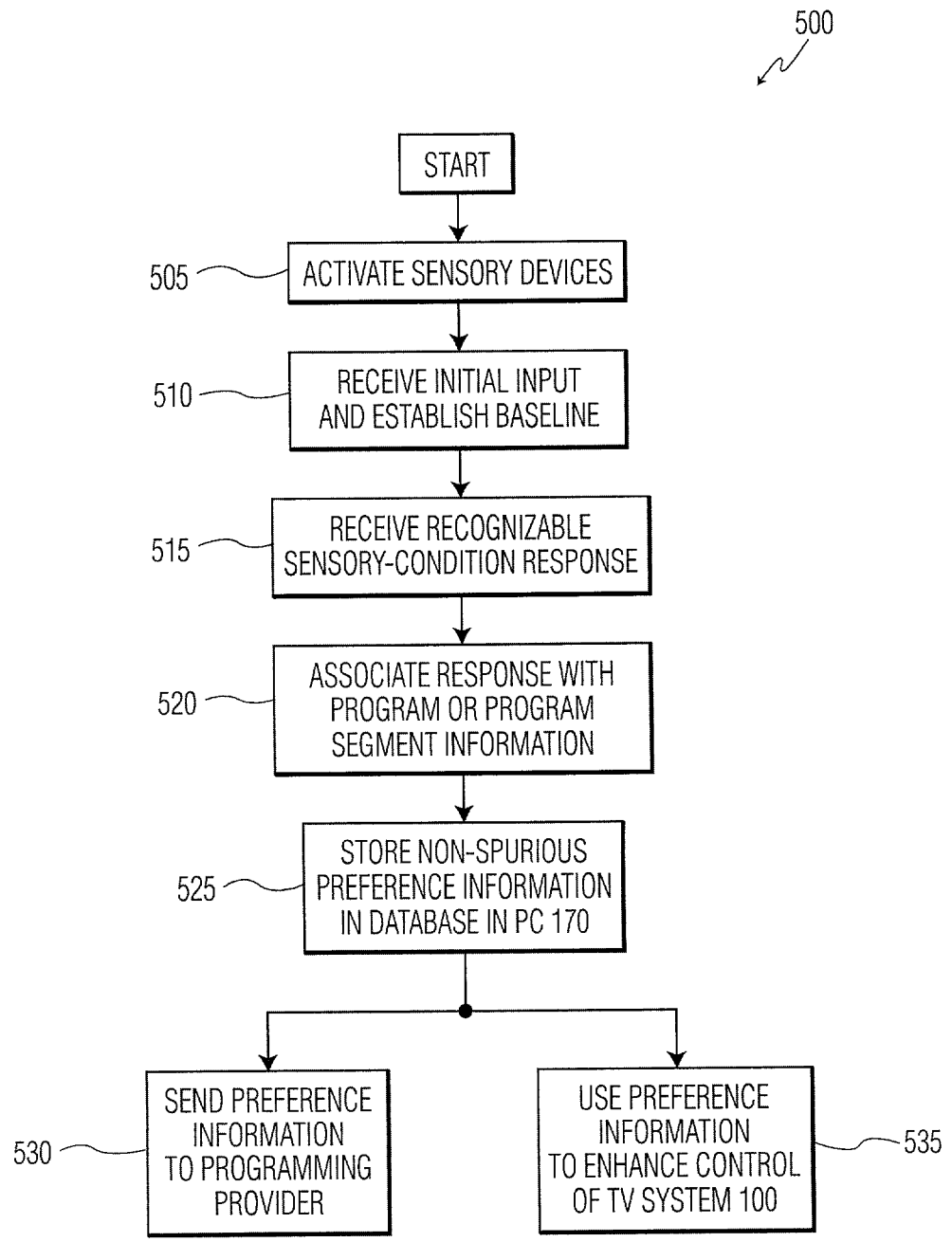
FIG. 5 is a flow chart illustrating a method of collecting, processing, and using sensory-feedback information according to an embodiment of the present invention.

FIG. 5 is a flowchart illustrating a method 500 of collecting, processing, and using sensory-feedback information according to an embodiment of the present invention. Initially (process step START), it is assumed that the programming reception and display system and the sensory feedback system is in place. As the program display begins, sensory devices are powered up and activated (process step 505). The system immediately receives initial input and, in the illustrated embodiment, establishes the initial input as a baseline (process step 510). In an alternate embodiment, a baseline for each identifiable viewer is already established, and a new baseline is determined only where the identity of a viewer cannot be determined. Sensor input is processed until a recognizable sensory condition is detected (such as a rise in temperature or perspiration level) (process step 515), at which time the indication is transmitted to the sensory processor for mood/emotion determination is associated with information regarding the program segment that was being displayed when the sensory result of the mood/emotion was detected (process step 520). If the response to the programming was within an expected range, the preference information is stored in a database (process step 525). Note that the preference information is not "within expected range" if it is wholly spurious, such as a normally somber viewer laughing through an unhappy segment—in which case some distraction is suspected. In a preferred embodiment, such responses are disregarded. The process may also continue with the steps of sending the preference information back to the provider (process step 530) or of using the preference information locally (process step 535) or both. (Several examples of local use have been provided above in reference to FIG. 4.)

Although the present invention has been described in detail, those skilled in the art should understand that they can make various changes, substitutions and alterations herein without departing from the spirit and scope of the invention in its broadcast form.

What is claimed is:

1. A system comprising:
   a receiver for receiving and displaying television programming;
   at least one sensor for sensing a physical reaction by a viewer viewing the displayed programming and generating a signal representative of the physical reaction;
   a processor for receiving and analyzing the signal representative of the physical reaction to determine if it can be associated with at least one recognizable viewer emotional response, whereupon satisfying said determination the processor associates the at least one recognizable viewer response with descriptive information that was being displayed during a time-stamped program segment of the displayed programming when the physical reaction was sensed by the at least one sensor, to provide a viewer preference relating to the descriptive information;
   a memory device for storing the association between the programming description displayed during the time-stamped program segment and said sensed physical reaction as the viewer preference;
   a monitoring system that monitors subsequent programs that become available to be displayed;
   a recommender that is configured to recommend subsequent programs based on the viewer preference; and
   a notification system for notifying and/or presenting a subsequent program based on the viewer preference.

2. The system according to claim 1, wherein the at least one sensor comprises a plurality of sensors.

3. The system of claim 2, further comprising a sensor-signal receiver for receiving the signals generated by at least some of the plurality of sensors.

4. The system of claim 3, wherein the sensor-signal receiver combines the received sensor signals so that the processor may analyze an aggregation of sensors signals.

5. The system of claim 1, wherein the at least one sensor further comprises a video image capturing device.

6. The system of claim 5, further comprising a video processor in communication with the video camera, the video processor comprising an image library for comparing to video images received from the video camera.

7. The system of claim 5, further comprising a video recorder for recording the images captured by the video camera.

8. The system of claim 1, further comprising an environmental sensor for sensing a change in the viewing environment and transmitting environmental information to the processor for use in analyzing viewer physical reactions.

9. A method of assessing viewer response to television programming that includes one or more distinct timed segments, said method comprising:
providing a receiver on which the viewer may view the programming;
monitoring at least one viewer physical condition;
associating the at least one viewer physical condition with a viewer response;
determining a reception time of a distinct time-stamped program segment is being received that corresponds to a pre-selected viewer response previously associated with the at least one viewer physical condition;
associating a viewer preference relating to the reception time of the distinct time-stamped program segment based on the viewer response;
determining predicted preferences relating to subsequent programming based on the viewer preference; and
notifying and/or presenting a subsequent program based on the viewer preference;
a memory device for storing the association between the programming description displayed during the reception time of the distinct time-stamped program segment and sensed reaction as the viewer preference.

10. The method of claim 9, wherein in the monitoring includes monitoring a plurality of viewer physical conditions.

11. The method of claim 9, wherein the at least one physical condition includes a change in the physical condition relative to a baseline level, the change being perceived during the monitoring.

12. The method of claim 9, wherein the at least one physical condition includes body temperature.

13. The method of claim 9, wherein the at least one physical condition includes heart rate.

14. The method of claim 9, wherein the monitoring is performed by an image-capturing device for capturing images of the viewer viewing the programming.

15. The method of claim 14, including providing a video processor for receiving the video images captured by the video camera and comparing them to reference data to interpret a viewer movement represented in the captured images.

16. The method of claim 9, including:
determining at least one distinguishing characteristic of a displayed programming segment;
associating a viewer response corresponding to a physical condition perceived during the display of the programming segment with a viewer preference level; and
applying the preference level to enhance program selection.

17. The method of claim 16, wherein program selection is enhanced by providing a notification that specified future programming will contain at least one segment possessing the at least one distinguishing characteristic.

18. The method of claim 16, wherein the program selection is enhanced by inserting into a program a segment possessing the at least one distinguishing characteristic.

19. The method of claim 16, wherein the program distinguishing characteristic is derived from electronic program guide (EPG) information provided with the television programming.

20. The method of claim 16, wherein the program segment distinguishing characteristic is derived from audio, video and text signal properties of television programming.

21. The method of claim 9, including:
providing a recorder coupled to the receiver to record selected program segments; and
automatically recording the program segment that corresponds to a pre-selected viewer response.

22. The method of claim 9, including:
extracting information related to the program segment that corresponds to a pre-selected viewer response from the television programming; and
automatically displaying the information on the receiver.

23. The method of claim 9, wherein the at least one viewer physical condition includes a biometric response.

24. The method of claim 23, wherein the biometric response includes galvactic skin response.

25. The method of claim 9, wherein the monitoring includes monitoring a visually observable response.

26. The method of claim 25, wherein the visually observable response is related to the gaze of the viewer.

27. The method of claim 26, wherein the visually observable response includes a direction of the viewer's gaze.

28. The method of claim 26, wherein the visually observable response includes a duration of the viewer's gaze in a certain direction before changing to a different direction.

29. The method of claim 25, wherein the visually observable response includes a furrowing of the viewer's brow.

30. The method of claim 29, wherein the monitoring includes measuring a depth of any furrows in the viewer's brow, tending to indicate confusion or lack of understanding.

31. The method of claim 9, wherein the associating of the at least one viewer physical condition with a viewer response is performed at least in part by using a Hidden Markov Model technique.

32. A method of assessing listener response to audio programming, comprising: providing a receiver having a speaker for presenting the audio programming to the listener;
monitoring at least one listener physical condition;
associating the at least one listener physical condition with a viewer emotional response;
determining a reception time of a distinct time-stamped program segment of the audio programming that corresponds to the at least one physical condition;
associating the viewer emotional response corresponding to the at least one physical condition with a user preference related to the distinct time-stamped program segment of the audio programming;
recommending subsequent audio programming based on the user preference; and
notifying and/or presenting the subsequent audio programming based on the user preference.

33. The method of claim 32, wherein the audible response includes listener laughter.

34. The method of claim 32, wherein the audible response includes an inflection of a listener's vocalization, tending to indicate a question has been vocalized.

35. The method of claim 32, wherein the associating of the at least one listener physical condition with a viewer emotional response is performed at least in part by using a Hidden Markov Model technique.

36. The method of claim 32, wherein the monitoring includes monitoring an audibly observable response.

37. The system of claim 1, wherein the at least one sensor includes a microphone for picking up vocalizations made by the viewer.

* * * * *